(No Model.)
C. W. STEBBINS.
DEVICE FOR HOLDING EARS OF CORN.
No. 567,284. Patented Sept. 8, 1896.
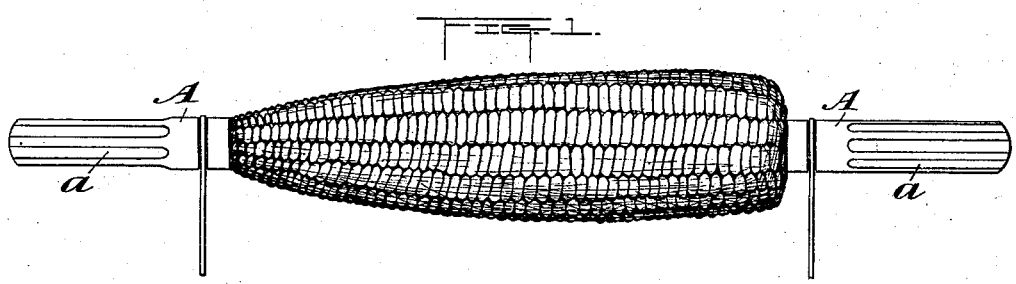
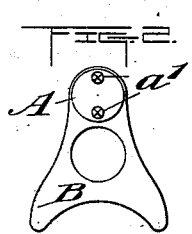
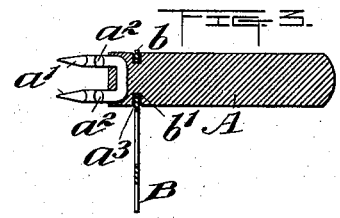
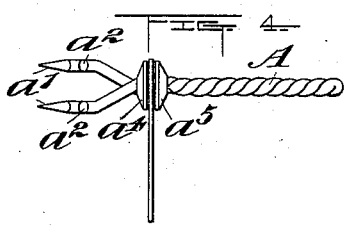
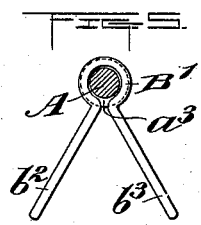
Witnesses
M B Seward
George Barry
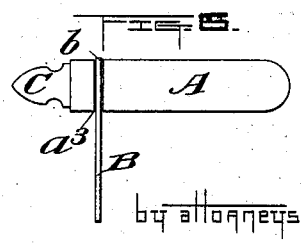
Inventor
Charles W. Stebbins,
by attorneys Brown Seward

UNITED STATES PATENT OFFICE.

CHARLES W. STEBBINS, OF HARTFORD, CONNECTICUT, ASSIGNOR TO F. P. PFLEGHAR & SON, OF NEW HAVEN, CONNECTICUT.

DEVICE FOR HOLDING EARS OF CORN.

SPECIFICATION forming part of Letters Patent No. 567,284, dated September 8, 1896.

Application filed July 19, 1895. Serial No. 556,501. (No model.)

*To all whom it may concern:*

Be it known that I, CHARLES W. STEBBINS, of Hartford, in the county of Hartford and State of Connecticut, have invented a new and useful Improvement in Devices for Holding Ears of Corn, of which the following is a specification.

My invention relates to an improvement in devices for holding ears of corn, such, for example, as the ears of green corn which are commonly served at the table after having been taken from boiling water, the object being to provide means for supporting the ear of corn out of contact with the table-spread and in such a manner that it may be rotated for purposes of applying salt and butter to it and lifted from the table to the mouth without requiring to be touched by the hand.

In the accompanying drawings, Figure 1 represents an ear of corn supported above the table in position to be manipulated. Fig. 2 represents one of the holders in end elevation. Fig. 3 represents the same in longitudinal section. Fig. 4 represents a modified form of holder. Fig. 5 represents a second modified form of holder, and Fig. 6 represents a third modified form.

The holder in its preferred form consists of a handle provided with prongs for entering the end of the ear of corn and pivotally engaged with a standard of sufficient height to hold an ear of corn above the surface of the table. In Figs. 1 to 3, inclusive, I have shown the handle A as of cylindrical form, provided with riffles $a$ for convenience in rotating it, and have provided it at its end with a pair of sharpened prongs $a'$ for entering the end of the ear of corn. The prongs $a'$ are provided with recesses $a^2$ intermediate of their points and the end of the handle, for the purpose of more securely retaining the ear of corn after they have been inserted, as the flexible cob will spring back into the recess and thereby prevent any tendency of slipping endwise from the prongs. The holder A is provided with an annular groove $a^3$ for receiving the rim $b$ of an eye $b'$, formed in the top of the standard B.

The standard B is preferably spread at its base to prevent the lateral tilting of the ear. This particular form may be conveniently made by inserting the standard B in a mold, in which the prongs $a'$ are also placed, and then casting the metal handle around the prongs and through the eye of the standard, subsequently loosening the standard to give it a free pivotal connection.

In the form shown in Fig. 4 the prongs and the handle A are formed integral by twisting the two branches of a bent piece of wire together and finally spreading them at their ends and sharpening them to form the prongs. The handle and prongs so formed may be secured in the eye of the standard by casting collars $a^4$ and $a^5$ upon the handle upon opposite sides of the standard.

Instead of forming the standard B of a piece of sheet metal, as represented Figs. 1 to 4, inclusive, it may be formed of a piece of wire, as represented in Fig. 5, in which the eye $B'$ is formed by bending a piece of wire about midway of its length and then gradually separating the branches $b^2$ $b^3$ to form a stable support. This may be sprung into position in the annular groove in the handle when the parts are assembled.

Instead of providing one or more sharpened prongs for engaging the end of the ear of corn, I may substitute the pointed blade C, as represented in Fig. 6, and this blade may conveniently serve the double function of a knife for slitting the kernels of corn and also for engaging the end of the ear to support it. The prongs themselves may also be made sufficiently sharp to open the kernels of corn, if so preferred.

It is obvious that other slight changes in the form and arrangement of the parts of the holder might be resorted to without departing from the spirit and scope of my invention. Hence I do not wish to limit myself strictly to the structures herein set forth, but

What I claim is—

The holder for ears of corn, comprising a handle provided with a device for engaging the end of the ear and a standard pivotally engaged with the holder to swing in a plane transverse to the longitudinal axis of the handle and forming a stable support for the ear above the surface of the table, substantially as set forth.

CHARLES W. STEBBINS.

Witnesses:
CHARLES A. SAFFORD,
CHARLES H. COWLES.